United States Patent [19]

Lunn

[11] Patent Number: 4,629,091
[45] Date of Patent: Dec. 16, 1986

[54] WORKPIECE ESCAPEMENT AND DIVIDER

[75] Inventor: Garfield R. Lunn, Amherstburg, Canada

[73] Assignee: Lamb Technicon Corp., Warren, Mich.

[21] Appl. No.: 651,463

[22] Filed: Sep. 17, 1984

[51] Int. Cl.$^4$ .................. G07F 11/00; B65G 59/00; B65G 47/26
[52] U.S. Cl. .......................... 221/12; 221/68; 221/252; 221/265; 198/424; 198/427
[58] Field of Search ............ 221/68, 12, 13, 17, 221/151, 153, 252, 265, 233, 234, 277; 198/424, 427

[56] References Cited

U.S. PATENT DOCUMENTS 2,743,001 4/1956 Nordquist ................... 221/68 X
2,744,608 5/1956 Ardell et al. ............... 198/424 X
3,292,768 12/1966 Matthews ................... 221/68 X Primary Examiner—Joseph J. Rolla
Assistant Examiner—Gregory L. Huson
Attorney, Agent, or Firm—Barnes, Kisselle, Raisch, Choate, Whittemore & Hulbert

[57] ABSTRACT

A turret journalled on a vertical axis has a plurality of vertically spaced pockets open at their upper and lower ends and spaced circumferentially around its outer periphery. A workpiece hopper has a downwardly extending outlet lying on the circle defined by the upper ends of the pockets so when a pocket registers with the outlet, a workpiece gravitates into the pocket. A motor driven worm gear which rotates about a horizontal axis is disposed adjacent the outer periphery of the pocket such that a workpiece deposited into the pocket registering with the hopper outlet is engaged by and between a pair of adjacent convolutions of the worm gear thread. That workpiece thus forms a driving connection between the worm gear and the turret to index the turret in a work-advancing direction to a position where the next upstream pocket on the turret registers with the hopper outlet to receive another workpiece and again index the turret in the work-advancing direction. The lower ends of the pockets are normally blocked by a stop plate that has a lost motion rotary driving connection with the turret. A proximity switch spaced circumferentially from the outlet senses the presence of a workpiece in an adjacent pocket to reverse the rotation of the worm gear and index the turret through a small arc relative to the stop plate which aligns the lower ends of the pockets with openings in the stop plate to discharge the workpieces thereform.

18 Claims, 2 Drawing Figures

WORKPIECE ESCAPEMENT AND DIVIDER

FIELD

This invention relates to a workpiece escapement and divider and, more particularly, to a device adapted to separate a row of end-to-end workpieces into individual pieces and reassembly them into several divided chutes or rows.

BACKGROUND

In the field of automation the art of separating a row of workpieces into individual units is usually known as escaping and the mechanism that does this is known as an escapement. The art of putting the individual pieces back into multiple rows or chutes is known as division and the mechanism that does this is known as a divider.

One of the problems encountered in escapements and dividers as conventionally designed resides in malfunctions resulting from non-removal of a workpiece from a row or the failure of a row of workpieces to receive an additional workpiece. Normally these malfunctions are detected by switches. Control intelligence is frequently furnished to command the mechanism to attempt to correct the malfunction until the necessary operating conditions are again met. Such detectors and controls are not only elaborate and expensive, but, in many instances, are not reliable because of the failure of the detectors themselves or the circuitry associated therewith. A failure of any kind can cause a near disaster in an automated manufacturing operation and result in the production of faulty parts.

The primary object of this invention is to provide an escapement and divider which overcomes the problems inherent with such devices of conventional design.

A further object of this invention is to provide an escapement and divider of economical design.

Another object of this invention is to provide an escapement and divider that is designed to avoid the possibility of malfunction thereof.

BRIEF DESCRIPTION OF THE DRAWING

These and other objects, features and advantages of the present invention will become apparent from the following description, appended claims and accompanying drawing, in which:

DETAILED DESCRIPTION

Figure 1:
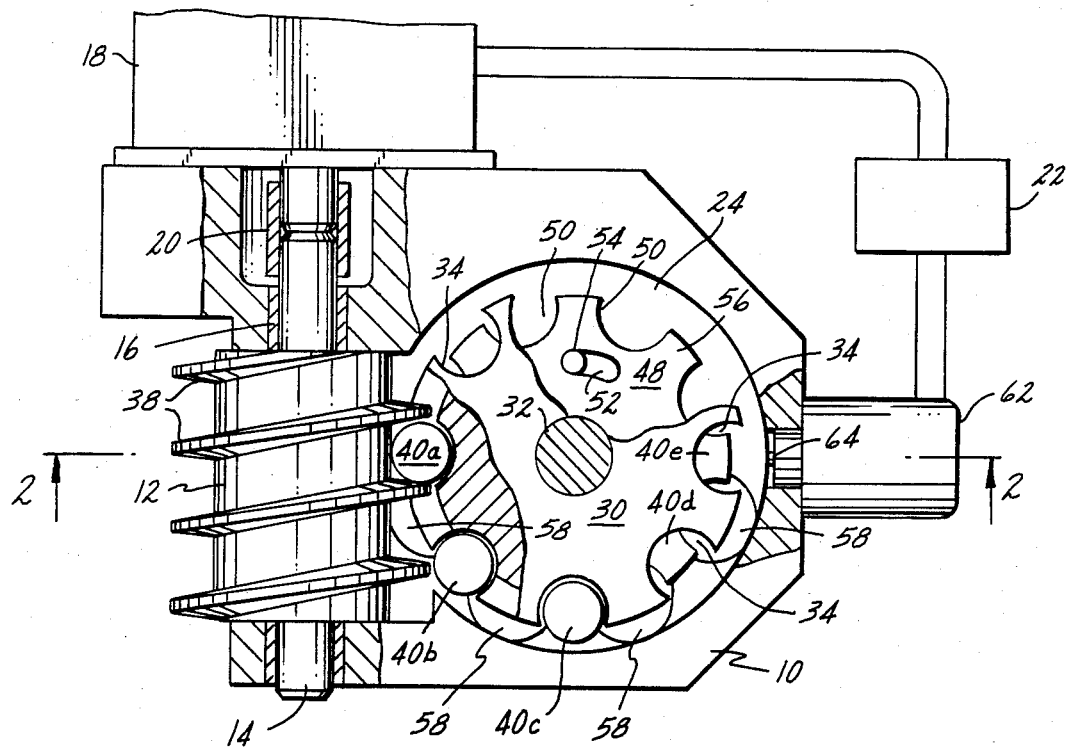
FIG. 1 is a top plan view of an escapement and divider according to the present invention partly in section and with parts removed.

The device according to the present invention includes a body 10 in which is supported for rotation about a horizontally extending axis a worm gear 12 by means of a shaft 14 to which the worm gear is keyed and bearings 16. Shaft 14 is driven by a motor 18 through a coupler 20. Motor 18 is a closed-loop servo motor whose speed and direction of rotation are under the control of a programmable controller 22. Adjacent worm gear 12, body 10 is formed with a cylindrical cavity 24. The upper end of cavity 24 is closed by a top plate 26 and the lower end of the cavity is closed by a bottom plate 28. Within cavity 24 there is supported for rotation about a vertical axis a turret 30. Turret 30 is journalled betwee plates 26,28 by means of a vertical shaft 32. Turret 30 is formed with a plurality of vertically extending pockets 34 spaced regularly around the outer periphery thereof. Pockets 34 extend throughout the vertical extent of turret 30 so that the pockets are open at the upper and lower ends. Likewise, as clearly shown in FIG. 1, pockets 34 are open radially outwardly at the periphery of turret 30. The outer periphery of turret 30 has an arcuate groove 36 into which one side of the worm gear 12 projects.

As shown in FIG. 1, worm gear 12 has a peripheral thread, the convolutions 38 of which have a pitch which corresponds generally to the diameter of the workpieces 40 for which the device is designed. These workpieces are supplied to the device from a hopper (not shown) through a vertical outlet conduit 42 in which the workpieces 40 are retained in vertically stacked, end-to-end relation. The lower end 44 of conduit 42 registers with an opening 46 in top plate 26, opening 46 being located directly above the workpiece position designated 40a in FIG. 1. It will be observed that worm gear 12 and turret 30 are disposed such that when a pocket 34 on turret 30 registers vertically with opening 46, a workpiece in conduit 42 is permitted to drop into pocket 34 and the workpiece so deposited in pocket 34 will be disposed between a pair of adjacent convolutions 38 on the worm gear 12. The workpiece at position 40a thus provides a driving connection between worm gear 12 and turret 30.

A stop plate 48 on vertical shaft 32 is disposed between the lower face of turret 30 and the top face of bottom plate 28. Stop plate 48 is formed around its outer periphery with a plurality of openings 50 which are spaced apart circumferentially to correspond and register with the lower ends of pockets 34. Stop plate 48 has an arcuate groove 52 into which a pin 54 on turret 30 projects. Groove 52 and pin 54 form a lost motion driving connection between turret 30 and stop plate 48. When pin 54 abuts one end of groove 52 as shown in FIG. 1 stop plate 48 is disposed such that the lugs 56 between the successive openings 50 therein underlie the lower open ends of pockets 34. Bottom plate 28 is also formed with four openings 58 spaced apart circumferentially a distance corresponding to the arcuate distance between the successive pockets 34 on turret 30 and, likewise, lie on a circle defined by the centers of pockets 34. A vertically downwardly extending discharge chute 60 in connected to each of the openings 58.

Beyond the counter-clockwise endmost opening 58 there is arranged on body 10 a proximity switch 62 having a sensor 64 adapted to detect the presence of a workpiece 40 in the radially adjacent pocket 34 in turret 30. Switch 62 is connected in circuit with the programmable controller 22 to direct a signal thereto when the sensor 64 detects the presence of a workpiece in the pocket 34 radially adjacent the switch.

Figure 2:
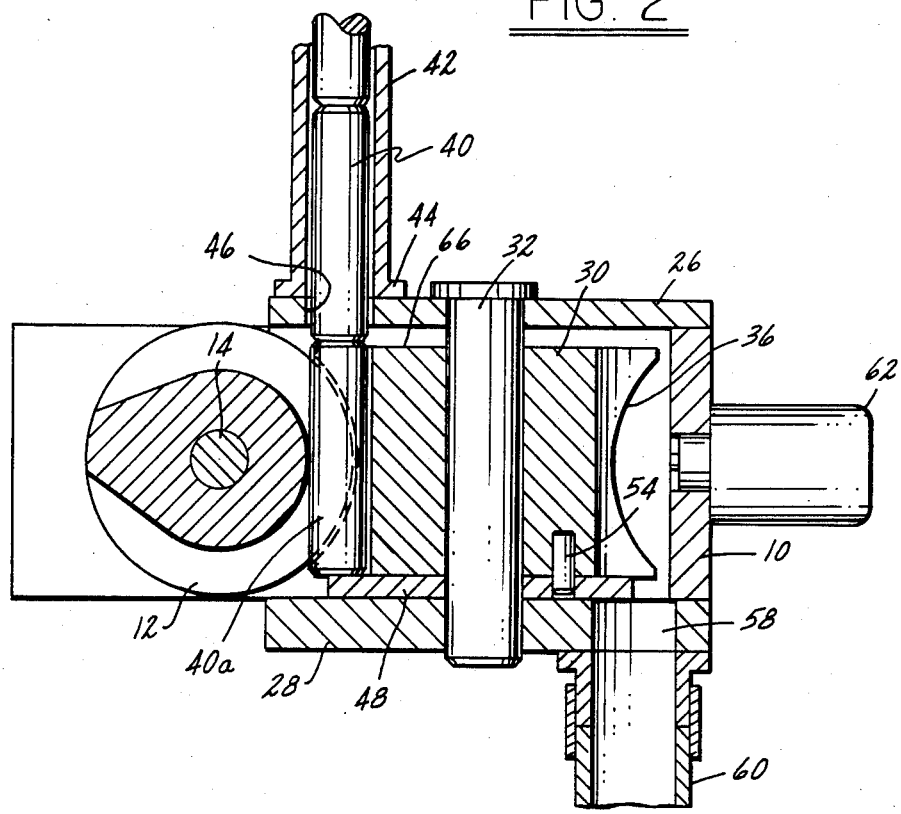
FIG. 2 is a sectional view along the line 2—2 in FIG. 1 with portions thereof shown out of position.

In operation, as mentioned previously, when a pocket 34 in turret 30 is located directly below an opening 46, the lowermost workpiece 40 in conduit 42 drops into the pocket and between two convolutions 38 in worm gear 12. When this occurs the workpiece at position 40a forms a driving connection between worm gear 12 and turret 30. When worm gear 12 is rotated by motor 18 in a counter-clockwise direction as viewed in FIG. 2, turret 30 is rotated in a counter-clockwise direction as viewed in FIG. 1. The arcuate spacing between pockets 34 in turret 30 is related to the pitch of the convolutions 38 such that two counter-clockwise revolutions of the worm gear will index turret 30 in the workpiece-advancing direction through an arcuate extent corresponding to the arcuate distance between the successive pockets. After two revolutions of worm gear 12, the workpiece which had previously been deposited into the position 40a will have been rotated to the position 40b out of engagement with the convolutions of the worm gear. Therefore, unless another workpiece is deposited from conduit 42 into position 40a turret 30 will not be further indexed even though the rotation of worm gear 12 may continue. Thus, the workpiece at the position 40b will not be advanced to the position 40c until such time as another workpiece is deposited at position 40a. It therefore follows that with this arrangement the deposit of a workpiece in a series of the successive pockets 34 of the turret 30 is assured.

The workpieces are retained in the pockets 34 by reason of the fact that the turret is rotating in a counter-clockwise direction and pin 54 abuts against the end of groove 52. This causes stop plate 48 to rotate with the turret in a position such that the lugs 56 block the lower ends of the pockets and support the workpieces 40 at their lower ends.

The turret continues to index in this manner until such time as workpieces are located in the positions 40a, 40b, 40c, 40d and 40e. When a workpiece advances to the position 40e it is detected by sensor 64 and switch 62 transmits a signal to controller 22 which reverses the direction of rotation of worm gear 12 for one revolution. This causes the turret 30 to be indexed in a clockwise direction through an arcuate distance corresponding to one-half the arcuate distance between the successive pockets 34. Pin 54 thus shifts to the opposite end of groove 52 while stop plate 48 remains stationary. The friction between the lower face of stop plate 48 and the top face of bottom plate 28 will ordinarily be sufficient to prevent stop plate 48 from rotating with turret 30 in the clockwise direction. After one revolution of worm gear 12 in a clockwise direction, openings 58 and 50 will be in vertical registration with the lower ends of pockets 34 and four workpieces will be discharged through chutes 60. Thereafter, the controller 22 will actuate motor 18 and rotate worm gear 12 through three revolutions in a counter-clockwise direction to advance the next successive empty pocket 34 to a position underlying opening 46 where another workpiece 40 will be deposited into position 40a.

In the embodiment illustrated the workpieces have a vertical dimension such that the upper ends thereof when disposed in pockets 34 are generally flush with the top face 66 of the turret 30. Thus, the lowermost workpiece 40 in conduit 42 simply slides over the upper face 66 of turret 30 until such time as a pocket 34 is aligned vertically with the opening 46.

It is apparent from the above description that the presence of a workpiece at the position 40a in a pocket 34 of the turret 30 is required to advance the turret. Therefore, any interruption in the supply of workpieces in the conduit 42 will prevent actuation of the switch 62. Switch 62 in turn will be actuated only when the presence of four workpieces is assured for feeding downwardly through the four discharge chutes 60. It will be appreciated, of course, that in the embodiment illustrated four openings 58 in bottom plate 28 are shown merely by way of example. Any number of workpieces can be dispensed in the device described, the quantity being limited only by the size of the turret, the number of discharge chutes 60 and the location of the proximity switch 62.

What is claimed is:

1. An escapement and divider for workpieces of a predetermined size and shape comprising a body, a turret mounted on the body for rotation about a generally vertical axis, said turret having a plurality of work-receiving pockets thereon spaced circumferentially about said axis at regular intervals, said pockets being open at their upper ends, a workpiece hopper having a vertically downwardly extending outlet lying on the circle defined by said circumferentially spaced pockets such that when the upper end of a pocket registers with said outlet, a workpiece at said outlet gravitates into said pocket, said pockets being sized and shaped such that a workpiece disposed therein has a portion thereof projecting outwardly of the pocket, a worm gear journalled on said body for rotation about a generally horizontal axis, said worm gear having a thread of predetermined pitch and being disposed adjacent said turret such that said projecting portion of a workpiece in the pocket registering with said outlet is engaged by and between a pair of adjacent convolutions of said thread and forms a rotary driving connection between the worm gear and the turret, a motor for rotating the worm gear to thereby impart a rotary indexing motion to the turret in a workpiece advancing direction whenever a workpiece is disposed in a pocket which registers with said outlet, the circumferential spacing of said pockets being related to the pitch of the thread on the worm gear such that when the thread convolutions revolve out of contact with the workpiece in said one pocket the turret has been indexed to a position wherein the next successive upstream pocket on the turret is aligned with said outlet and means for discharging the advanced workpiece from a pocket after the turret has been indexed through a predetermined arc relative to said outlet.

2. An escapement and divider as called for in claim 1 wherein said outlet is designed to store several workpieces oriented in end-to-end, vertically stacked relation and including means on said turret for retaining the workpieces in said pockets such that the upper ends of the workpieces are generally coplanar with the upper ends of said pockets.

3. An escapement and divider as called for in claim 2 wherein said pockets have a vertical dimension corresponding generally to the vertical dimension of the workpiece.

4. An escapement and divider as called for in claim 2 wherein the turret has a generally flat, horizontally extending surface at the upper end thereof disposed directly below said outlet and extending circumferentially between the upper ends of the adjacent pockets, said surface being adapted to slideably engage the lower end of the workpiece at said outlet.

5. An escapement and divider as called for in claim 2 wherein said pockets have lower open ends and including an apertured plate below said turret through which the workpieces are adapted to be discharged from said turret.

6. An escapement and divider as called for in claim 1 wherein the pockets are open at their lower ends to enable the workpieces to be discharged downwardly therefrom and including a stop member positioned below and normally blocking the lower ends of the pockets, said means for discharging workpieces comprising means for relatively shifting the turret to a position wherein the stop member clears the lower ends of the pockets to permit the workpieces therein to gravitate therethrough.

7. An escapement and divider as called for in claim 6 wherein said stop member comprises a rotatable plate concentric with the axis of the turret and having an opening therein lying on the circle defined by the lower ends of the pockets, said shifting means being adapted to rotate the turret relative to the plate to a position wherein the opening in the plate registers with the lower end of a pocket.

8. An escapement and divider as called for in claim 7 wherein said shifting means includes a sensor on said body spaced circumferentially from said outlet for detecting the presence of a workpiece in a pocket adjacent the sensor for reversing rotation of the motor so as to index the turret in the reverse direction to align the opening in the plate with the lower end of a pocket in the turret.

9. An escapement and divider as called for in claim 8 wherein the pitch of the thread is related to the spacing between adjacent pockets such that two revolutions of the worm gear are required to advance the turret through an arcuate extent corresponding to the circumferential spacing between adjacent pockets, said shifting means being adapted to rotate the worm gear through one revolution to align the lower end of a pocket with the opening in said plate.

10. An escapement and divider as called for in claim 1 wherein the pockets are spaced around the outer periphery of the turret and the worm gear is disposed laterally at one side of the turret.

11. An escapement and divider as called for in claim 10 wherein the pockets are shaped such that said portion of the workpiece projects from the pocket in a direction radially outwardly of the turret.

12. An escapement and divider as called for in claim 11 wherein a section of the turret adjacent each pocket is recessed radially inwardly such that said portion of the workpiece projects radially outwardly through said recessed section to enable adjacent convolutions of the worm gear to engage the workpiece in the pocket registering with said outlet.

13. An escapement and divider as called for in claim 11 wherein said pockets have lower open ends, said means for discharging workpieces from the pockets comprising a fixed plate on said body underlying the turret and having a plurality of openings therein with which the lower ends of said pockets are adapted to register when the turret is indexed, individual discharge chutes extending from each of the last-mentioned openings, a stop plate interposed between the lower ends of said pockets and said fixed plate, said stop plate being rotatable about the axis of the turret, said stop plate having a plurality of openings therethrough spaced apart circumferentially to register with the lower ends of the pockets and the openings in the fixed plate, means for rotating said stop plate in unison with said turret with the stop plate disposed in a first position wherein the portions thereof extending circumferentially between adjacent openings therein block the lower ends of said pockets and means for rotating the turret relative to said stop plate to a second position wherein the openings in the stop plate register with the lower ends of the pockets and the openings in said fixed plate.

14. An escapement and divider as called for in claim 13 wherein said stop plate has a lost motion driving connection with said turret such that, when the turret is indexed in the workpiece advancing direction, said stop plate assumes said first position relative to the turret and, when the turret is rotated in an opposite direction through a predetermined arc, said stop plate assumes said second position relative to the turret.

15. An escapement and divider as called for in claim 14 wherein said lost motion connection is designed such that the arcuate spacing between said first and second positions is equal to approximately half the arcuate distance between adjacent pockets.

16. An escapement and divider as called for in claim 14 wherein said lost motion connection comprises an arcuate slot on one of said turret and stop plate and an abutment on the other of said turret and stop plate engaged in said arcuate slot.

17. An escapement and divider as called for in claim 16 including a sensor on said body spaced circumferentially from said outlet for detecting the presence of a workpiece in a pocket adjacent the sensor, said sensor, when detecting a workpiece in said last-mentioned pocket, being adapted to reverse the rotation of the worm gear and thereby index the turret in the reverse direction through an arcuate extent less than the spacing between the pockets to locate the turret relative to the stop plate in a position wherein the lower ends of the pockets register with the openings in the stop plate and the fixed plate.

18. An escapement and divider as called for in claim 17 wherein the pitch of the thread on the worm gear is related to the arcuate spacing between adjacent pockets such that two revolutions of the worm gear are required to index the turret through an arc corresponding to the arcuate spacing between successive pockets, said sensor, when detecting a workpiece in the pocket adjacent thereto, being adapted to rotate the worm gear through a single revolution.

* * * * *